United States Patent [19] [11] Patent Number: 4,776,679
Kitagishi et al. [45] Date of Patent: Oct. 11, 1988

[54] OBJECTIVE OF VARIABLE FOCAL LENGTH

[75] Inventors: Nozomu Kitagishi, Tokyo; Hiroki Nakayama, Kanagawa; Shigeyuki Suda, Tokyo; Jun Hattori, Kanagawa; Akihisa Horiuchi, Tokyo, all of Japan

[73] Assignee: Canon Kabushiki Kaisha, Tokyo, Japan

[21] Appl. No.: 872,139

[22] Filed: Jun. 9, 1986

[30] Foreign Application Priority Data

Jun. 10, 1985 [JP] Japan ................. 60-125713

[51] Int. Cl.$^4$ ............................................. G02B 15/14
[52] U.S. Cl. ................................................. 350/427
[58] Field of Search ............................. 350/427, 413

[56] References Cited

U.S. PATENT DOCUMENTS 3,718,383 2/1973 Moore .
3,729,253 4/1973 Moore .
4,571,032 2/1986 Someya et al. ................. 350/427

OTHER PUBLICATIONS

Meyer-Arendt, Intro. Clas. and Mod. Optics (1984) 362.5.
Atkinson et al., App. Optics, vol. 21, No. 6 (1982) 993:8.
Atkinson III et al., App. Optics, vol. 23, No. 11 (1984) 1735:41

Primary Examiner—John K. Corbin
Assistant Examiner—Rebecca D. Gass
Attorney, Agent, or Firm—Fitzpatrick, Cella, Harper & Scinto

[57] ABSTRACT

A variable focal length objective of which at least one of a pulrality of lens units is moved to vary the image magnification, wherein at least one of the plurality of lens units has at least one refractive index distribution type lens provided with a condition of $N_1>0$ as, taking the distance from the optical axis to a radial direction as h, the refractive index distribution is expressed by $N(h)=N_0+N_1h^2+N_2h^4+N_3h^6+\ldots$ ($N_0, N_1, N_2\ldots$ are constants), and satisfies the following conditions:

$$\frac{L\text{min}}{f\text{max}} < 1.2 \times \exp\left\{0.5 \times \left(\frac{5y}{f\text{max}} - 1\right)\right\}$$

$$\Sigma 2N_1{}^*D^* > 0.2/f\text{min}$$

where
fmax: the maximum focal length;
fmin: the minimum focal length;
Lmin: the optical total length when the total length is shortest;
Y: the maximum image height;
$N_1{}^*$: the coefficient of $h^2$ of the refractive index distribution type lens having a refractive index distribution of $N_1>0$;
$D^*$: the lens thickness of the refractive index distribution type lens having the refractive index distribution of $N_1>0$.

10 Claims, 10 Drawing Sheets

SPHERICAL ABERRATION  ASTIGMATISM  DISTORTION d-LINE, g-LINE, F4
f=100
-1.00  1.00

17.17°
ΔM  ΔS
-1.00  1.00

17.17°
-5.00%  5.00% d-LINE, g-LINE, F4
f=200
-1.00  1.00

8.78°
ΔS
ΔM
-1.00  1.00

8.78°
-5.00  5.00 d-LINE, g-LINE, F4
f=304.5
-1.00  1.00

5.8°
ΔM  ΔS
-1.00  1.00

5.8°
-5.00  5.00

SPHERICAL ABERRATION
F4
g-LINE
d-LINE
f=100
-1.00  1.00

ASTIGMATISM
16.8°
ΔS
ΔM
-1.00  1.00

DISTORTION
16.8°
-5.00%  5.00%

F4
g-LINE
d-LINE
f=200
-1.00  1.00

8.6°
ΔS
ΔM
-1.00  1.00

8.6°
-5.00  5.00

F4
g-LINE
d-LINE
f=286
-1.00  1.00

6°
ΔM  ΔS
-1.00  1.00

6°
-5.00  5.00

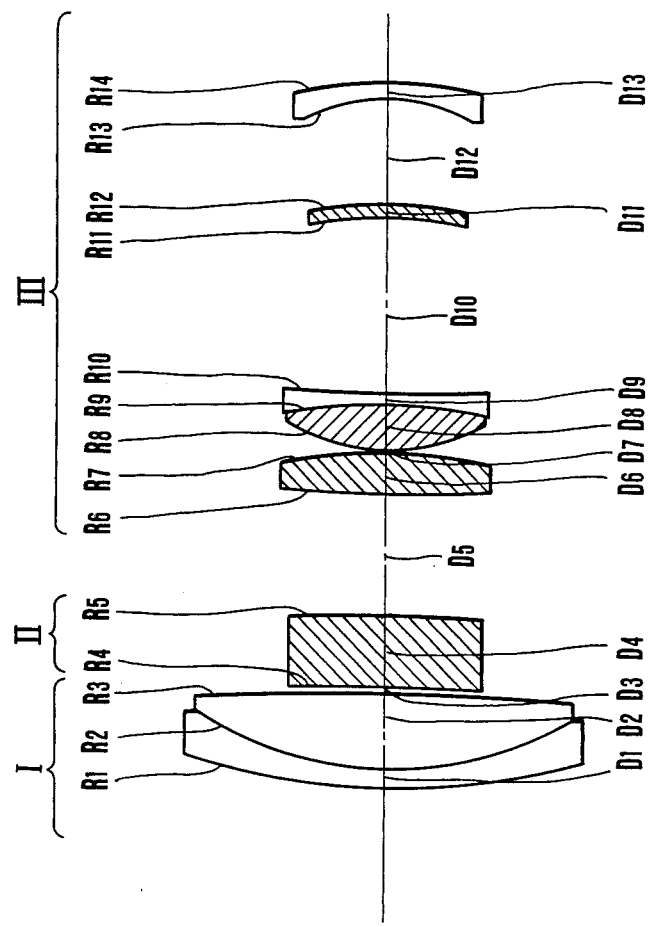

OBJECTIVE OF VARIABLE FOCAL LENGTH

BACKGROUND OF THE INVENTION

1. Field of the Invention

This invention relates to variable focal length objectives, and more particularly to compact variable focal length objectives having refractive index distribution type lenses.

2. Description of the Related Art

Recently, the requirement of reducing the bulk and size of the variable focal length objective has been becoming more and more urgent, and there are various proposal for shortening the optical total length.

But, in general, as the optical total length of the variable focal length objective shortens, the Petzval sum is caused to rapidly increase in the negative sense with the result of a large over-correction of the curvature of field. This aberration is very difficult to correct, giving rise to a fatal obstruction in attaining a desired decrease of the optical total length of the variable focal length objective.

In order to achieve an advance in the compactness of the entire system of the variable focal length objective, for example, of the type comprising a plurality of lens units, of which the first and second counting from the front are positive and negative in power respectively and movable with the air separation therebetween being made variable for varying the focal length of the entire system, or of the type comprising, from front to rear, a positive first lens unit, a negative second lens unit, a positive or negative third lens unit and a positive fourth lens unit, the first to third lens units constituting a zoom section, and the fourth lens unit constituting a relay lens, in other words, the so-called 4-component type, or of the type comprising a plurality of lens units, of from front to rear, a positive first lens unit, a negative second lens unit and a third lens unit of strong positive power, whereby as the focal length of the entire system varies from the shortest to the longest, whilst the separation between the first and second lens units increases and the separation between the second and third lens units decreases, the third lens unit moves forward, there are the three conventional methods (1) by strengthening the power of each of the lens units which constitute the zoom section, (2) by decreasing the telephoto ratio of the relay lens, and (3) by employing the telephoto type in designing the third positive lens unit. However, the use of the first method (1) results in the production of a large negative value of the Petzval sum in the second lens unit as this lens unit usually as the variator has the strongest power. This implies that the curvature of field is extremely over-corrected. The second method (2), too, has a similar result, becuase the direction of decreasing the telephoto ratio of the relay lens coincides with the direction in which the Petzval sum is produced to a negative value. So, the use of this method unavoidably leads to over-correct the curvature of field. Also, the third method (3) is not useful from the similar reason.

Further, if such Petzval sum is corrected by lowering the refractive index of the convex lens, or by using a positive lens of strong power in combination with a negative lens, very large spherical aberration or very large higher order aberrations is or are produced which cannot be well corrected. In such a manner, the requirement of reducing the bulk and size of the variable focal length objective is in contradiction to the requirement of correcting the Petzval sum, as far as the system of the lenses all of which are made of homogeneous material is concerned. This is valid not only in the above-mentioned types of variable focal length objectives, but also another types of variable focal length objectives in which as the first lens unit moves during zooming, the total length increases with increase in the focal length, or in which the fourth lens unit is made axially movable with zooming.

Further, the 2-component zoom lenses comprising from front to rear a negative first lens unit and a positive second lens unit, are of no exception.

That is, in the case of the 2-component zoom lenses, letting the focal lengths of the first and second lens units be denoted by f1 and f2 respectively and the image magnification of the second lens unit by $\beta 2$, the focal length f of the entire system can be expressed by $f = f1 \times \beta 2$, and the distance S2 between the object side position and the image side position of the second lens unit by $S2 = f2 \times (1 - \beta 2)^2 / \beta 2$. Therefore, even with the same image magnification of the second lens unit, the shorter the focal length of the second lens unit, the greater the reduction of the optical total length of the entire system can be made. It should be noted here that to allow for a reduction of the focal length of the second lens unit with maintenance of the air separation between the first and second lens units at the telephoto end to larger values than an acceptable minimum, the second lens unit must be designated to the telephoto type of power arrangement, and the tendency of the telephoto type must be so strengthened that the principal point is shifted enough forward. The use of this method in achieving the desired reduction of the total length results in the production of a large negative value of the Petzval sum. So the curvature of field is over-corrected. Also, the correction of the Petzval sum by lowering the refractive index of the convex lens, or by using a positive lens of strong power in combination with a negative lens of strong power, results in objectionable increase of the spherical aberration or the production of higher order aberrations, any of which is difficult to correct.

In such a manner, regardless of what type is employed in designing variable focal length objectives, attempts to a desired reduction of the total length of the entire system have been foiled without exception by the difficulty of well correcting the curvature of field.

SUMMARY OF THE INVENTION

An object of the present invention is to provide a variable focal length objective of greatly advanced compactness while still permitting good correction of field curvature to be achieved for high grade of imagery.

BRIEF DESCRIPTION OF THE DRAWINGS

FIGS. 3(A) and 3(B) are respectively a block diagram of still another specific variable focal length objective of the invention and a graphic representation of its aberrations.

DETAILED DESCRIPTION OF THE PREFERRED EMBODIMENTS

Figure 1A:
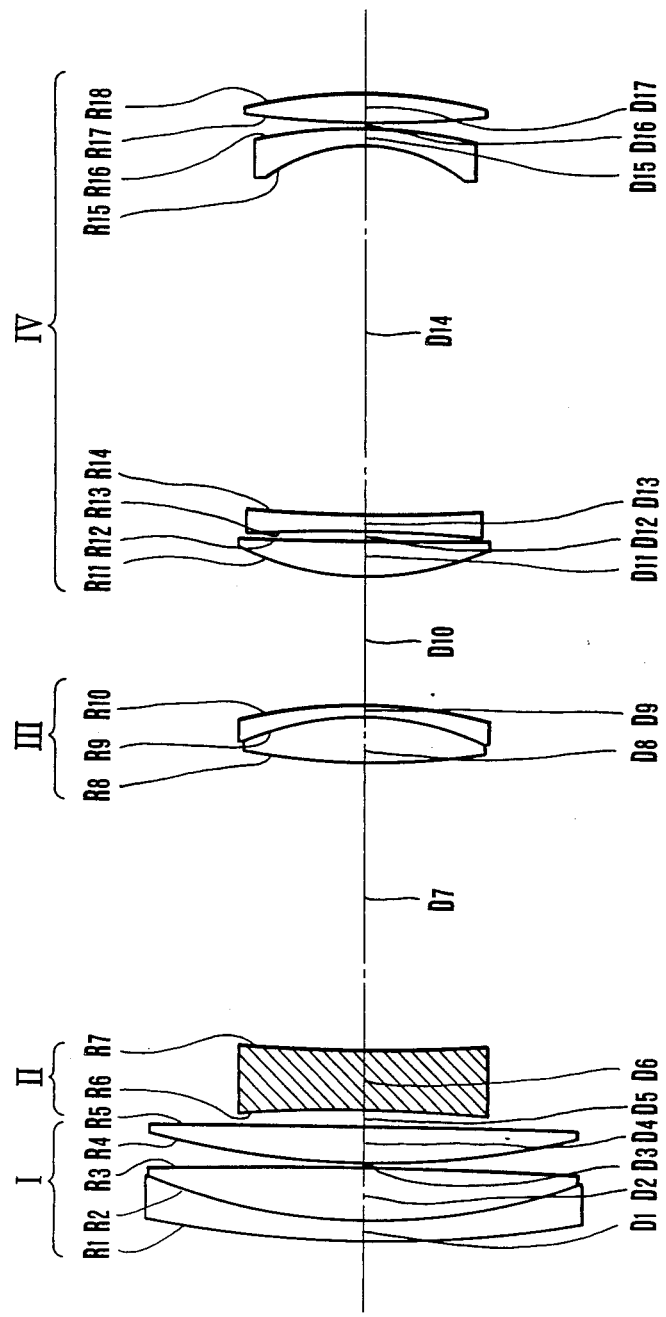
FIGS. 1(A) and 1(B) are respectively a block diagram of a specific varible focal length objective of the invention and a graphic representation of its aberrations.

In the general embodiment of the invention, the variable focal length objective comprises a plurality of lens units, of which at least one unit is axially moved to vary the focal length of the entire system, wherein as the refractive index N and the height h from the optical axis are related by the equation: $N(h) = N_0 + N_1 h^2 + N_2 h^4 + N_3 h^6 + \ldots$ ($N_0, N_1, N_2 \ldots$ are constants), at least one of the plurality of lens units is included with at least one refractive index distribution type lens having a feature of $N_1 > 0$, and the following conditions are satisfied:

$$\frac{Lmin}{fmax} < 1.2 \times \exp\left\{0.5 \times \left(\frac{5y}{fmax} - 1\right)\right\} \quad (1)$$

$$\Sigma 2N_1^* D^* > 0.2/fmin \quad (2)$$

where
fmax: the longest focal length;
fmin: the shortest focal length;
Lmin: the optical total length at the minimum of the physical length;
y: the maximum image height;
$N_1^*$: the coefficient of $h^2$ of that lens of the refractive index distribution type which has a refractive index distrubtion of $N_1 > 0$;
D*: the lens thickness (the separation between the front and rear surface measured on the optical axis) of that lens of the refractive index distrubtion type which has the refractive index distribution of $N_1 > 0$ In the above-stated inequality (1), the left side term or Lmin/fmax is usually called the telephoto ratio of the variable focal length objective, and becomes a useful index to the degree of shortness of the physical length of the variable focal length objective. When the angular field increases, the difficulty of minimizing the telephoto ratio is, however, rapidly increased. If, in the ordinary or homogeneous lens system, Lmin/fmax does not satisfy the condition (1), the Petzval sum takes a negative value, or it becomes difficult to avoid an overcorrection of the curvature of field. For note, when the optical total length exceeds the right side value of the inequality of condition (1), the objective is liable to be under-corrected for the field of curvature.

Also, the captial sigma in the equality of condition (2) indicates that when two or more refractive index distribution type lenses of $N_1 < 0$ are used, their sum must be considered.

When the refractive index distribution takes place in a direction perpendicular to the optical axis, or in the case of the so-called radial refractive index distribution type lens, the power the interior of that lens attributes to can be written approximately as $-2N_1 D$. When $N_1$ is positive, the interior of the lens has a negative power or a diverging action (negative gradient power). If, as the refractive index distribution type lens of negative gradient power is plural in number, the total sum of their internal powers in relation to the power of the entire system satisfies the condition (2), it becomes possible to achieve good correction of the Petzval sum. For note, if the condition (2) is violated, though the spherical aberration and coma can be advantageously corrected, no great advance to the fulfillment of both requirements of well correcting the Petzval sum or curvature of field and of shortening the optical total length can be achieved.

It should be recognized that the inclusion of at least one refractive index distribution type lens which satisfies the above-stated conditions in at least one of the plurality of lens units sets forth a feature which is characteristic of the invention. It is, therefore, to be understood that the scope and spirit of the invention covers those objectives which further includes, for example, such a refractive index distribution type lens that the refractive index decreases as the radial distance from the optical axis increases, or that $N_1 > 0$, that is, the gradient power is positive, or such a refractive index distribution type lens that the refractive index varies along the optical axis, or that is of the axial type, or both radial and axial types of refractive index distributive lenses, for an improved result is attained.

It is also to be understood that the principle of the invention is applicable not only to the 2-component, 3-component and 4-component variable focal length objectives but also to any other zoom types, and further to other fields of lenses without limitation.

For note, the refractive index distribution in the aforesaid axial type lens may be expressed by the following equation:

$$N(x) = N_0 + N_1 x + N_2 x^2 + N_3 x^3 + \ldots \quad (N_0, N_1, N_3, \ldots \text{ are constant})$$

where x is the axial distance measured from the front vertex toward the rear.

The present invention is next described in connection with specific embodiments thereof.

Figure 1B:
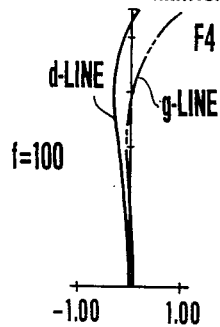
Figure 1B:
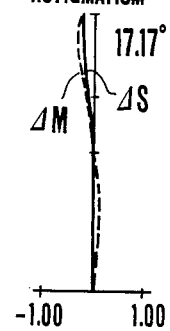
Figure 1B:
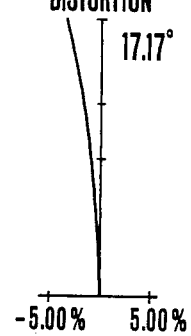
Figure 1B:
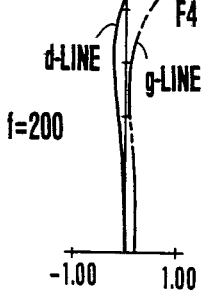
Figure 1B:
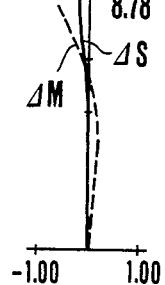
Figure 1B:
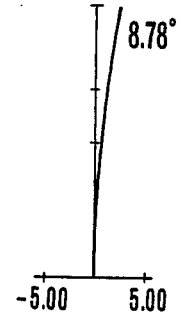
Figure 1B:
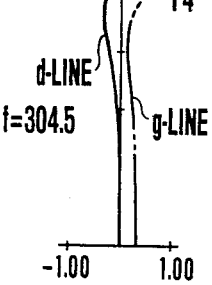
Figure 1B:
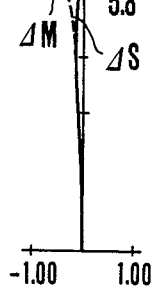
Figure 1B:
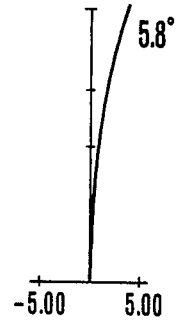

FIG. 1(A) is a longitudinal section view illustrating the construction and arrangement of the lens units of the variable focal length objective according to the invention. FIG. 1(B) shows its aberrations in three operative positions.

In FIG. 1(A), Ri (i=1, 2, 3 ...) represents the i-th surface counting from the front, Di (I=1, 2, 3 ...) the axial air separation or axial thickness between the i-th and (i+1)th surfaces counting from the front, and I the first lens unit, II the second lens unit, III the third lens unit, and IV the fourth lens unit. Also, in FIG. 1(B), the spherical aberration, astigmatism and distortion are shown in the focal length positions of f=100 mm, 200 mm and 304.5 mm. In the figure, d and g stand for d-line and g-line respectively, and S and M denote the sagittal surface and meridional surface respectively. For note, in the section view, the refractive index lens is depicted with hatching for the purpose of clear identification.

The variable focal length objective of FIG. 1 comprises, from front to rear, the positive first lens unit I which is held stationary during variation of the focal length, the negative second unit II which axially moves during variation of the focal length to contribute to the variation of the focal length, the positive third lens unit III which axially moves during variation of the focal length to compensate for the shift of an image plane, and the positive fourth lens unit IV which is held stationary during variation of the focal length, a radial refractive index distribution type lens of negative power gradient that satisfies the above-stated inequalities (1) and (2) being used in the negative second lens unit aII or the so-called variator.

The refractive index distribution type lens is different from the ordinary lens of homogeneous material and gets even in its interior a converging or diverging action. For the refractive index distribution along the line perpendicular to the optical axis expressed by the above-described equation: $N(h)=N_0+N_1h^2+N_2h^4+\ldots$, the interior of the lens has a power of $-2N_1D$. In this specific embodiment, the power of the interior of the refractive index distribution type lens accounts for 5/6 of the power of the variator consisting of the second lens unit II.

Also, the refractive index distribution type lens has an ability to correct aberrations, and plays an excellent role particularly in correcting the Petzval sum. The Petzval sum P produced from the refractive index distribution type lens varies as a function of the power $\phi$ owing to the convergence or divergence of its interior material referred to the normalized focal length of the entire system to unity and the refractive index $N_0$ at the base, or $P=\phi/N_0^2$, that is, in inverse proportion to the square of the value $N_0$ of the refractive index, being smaller than that produced from the refracting surfaces thereof which can be expressed by $P=\phi/N_0$. Therefore, whilst the homogeneous system of the same power arrangement as in the objective of this embodiment has its variator resulting in the production of the Petzval sum on the order of $-1.25$ to $-1.3$, it is in the variable focal length objective of the invention that the variator has its Petzval sum reduced to as small as $-1.025$.

This fact implies that a possibility of further minimizing the optical total length of the entire system either by strengthening the power of the zoom section or by decreasing the telephoto ratio of the relay section is created without sacrificing the image quality. In the past, however, such an increase of the power of the zoom section or such a decrease of the telephoto ratio of the relay section for the purpose of shortening the total length resulted in a large increase of the Petzval sum in the negative sense. The impossibility of correcting it was the most serious problem. But, the employment of a lens unit whose Petzval sum has a reduced value in the negative sense as the variator consisting of the negative seconds lens unit II in the variable focal length objective leads to increase the possibility of shortening the optical total length of the entire system by the above-described method. This is reflected to the variable focal length objective of the invention in such a way that the telephoto ratio of the relay section which consists of the positive fourth lens unit is reduced so that for the optical total length of the entire system taken at a value of 254.8 mm, the ratio of the optical total length to the longest focal length of the entire system, or the telephoto ratio, is reduced to a very small value of 0.836. Further, the refractive index of the positive lens at the frontmost position in the relay section is made higher by a corresponding amount to the room created for correction of the Petzval sum to achieve good correction of spherical aberration.

Meanwhile, the refractive index distribution type lens can be corrected for aberrations both at and inside the lens surfaces by controlling the refractive index distribution. So, the variator which would otherwise necessitate up to five lens elements as usual is enabled to be constructed by only one lens element and moreover in the form that both of its surfaces are weak in curvature.

In order to correct the spherical aberration by bending the rays of light passing through the interior of the lens on account of the control of the refractive index distribution shape, it is an actual practice, for example, that if one puts $N(h)=N_0+N_1h^2+N_2h^4+N_3h^6+\ldots$ in shaping the refractive index distribution as has been described above, what value of the coefficient $N_2$ is appropriate is determined.

In such a manner, the variable focal length objective of the invention is provided with at least one refractive index distribution type lens having the feature of $N_1>0$ in the equation for the refractive index distribution, thereby it being made possible to achieve a much-desired reduction of the bulk and size while still permitting an improvement of the image quality.

The variable focal length objective of the invention shown in FIG. 1 can be constructed in accordance with the numerical data given in Tables 1.1 to 1.3 for the focal lengths of the entire system, f, the F-number, FNO, the image angles, $2\omega$, the radii of curvature, R, the axial thicknesses or air separations, D, the refractive indices, N, and Abbe numbers, $\nu$, of the lens elements with the subscripts numbered consecutively from front to rear along with the coefficients $N_0$, $N_1$, $N_2$ for the spectral d-line and g-line of the above-described equation for refractive index distribution.

TABLE 1.1

| f = 100–304.5  FNO = 4.0  2ω = 34.34°–11.6° | | | |
|---|---|---|---|
| Radius of curvature | Axial thickness or air separation | Refractive index | Abbe number |
| R1 = 210.378 | D1 = 3.90 | N1 = 1.80518 | ν1 = 25.4 |
| R2 = 95.402 | D2 = 9.40 | N2 = 1.61272 | ν2 = 58.7 |
| R3 = −4243.836 | D3 = 0.14 | | |
| R4 = 135.346 | D4 = 6.68 | N3 = 1.61272 | ν3 = 58.7 |
| R5 = −2643.187 | D5 = Variable | | |
| R6 = −279.005 | D6 = 10.53 | N4 = N4 (h) | |
| R7 = 258.188 | D7 = Variable | | |
| R8 = 133.470 | D8 = 8.08 | N5 = 1.51633 | ν5 = 64.1 |
| R9 = −46.653 | D9 = 2.09 | N6 = 1.75520 | ν6 = 27.5 |
| R10 = −84.501 | D10 = Variable | | |
| R11 = 49.541 | D11 = 6.27 | N7 = 1.71300 | ν7 = 55.2 |
| R12 = 1079.685 | D12 = 1.11 | | |
| R13 = −380.726 | D13 = 2.78 | N8 = 1.80518 | ν8 = 25.4 |
| R14 = 271.435 | D14 = 64.41 | | |
| R15 = −25.406 | D15 = 2.78 | N9 = 1.76200 | ν9 = 40.1 |
| R16 = −72.472 | D16 = 0.28 | | |
| R17 = 227.126 | D17 = 5.01 | N10 = 1.59551 | ν10 = 30.5 |
| R18 = −75.129 | | | |

TABLE 1.2

| | f | | |
|---|---|---|---|
| Di | 100 | 200 | 304.5 |
| D5 | 2.7787 | 47.8801 | 63.3781 |
| D7 | 51.0469 | 26.2032 | 0.2132 |
| D10 | 23.2531 | 2.9954 | 13.4873 |

TABLE 1.3

| Ni (h) | λ | $N_0$ | $N_1$ | $N_2$ | $N_4$ |
|---|---|---|---|---|---|
| N4 (h) | d | 1.47069 | $8.0759\times10^{-4}$ | $-3.1382\times10^{-7}$ | $8.9457\times10^{-11}$ |
| | g | 1.47925 | $8.0465\times10^{-4}$ | $-3.1744\times10^{-7}$ | $9.5646\times10^{-11}$ |

Figure 2A:
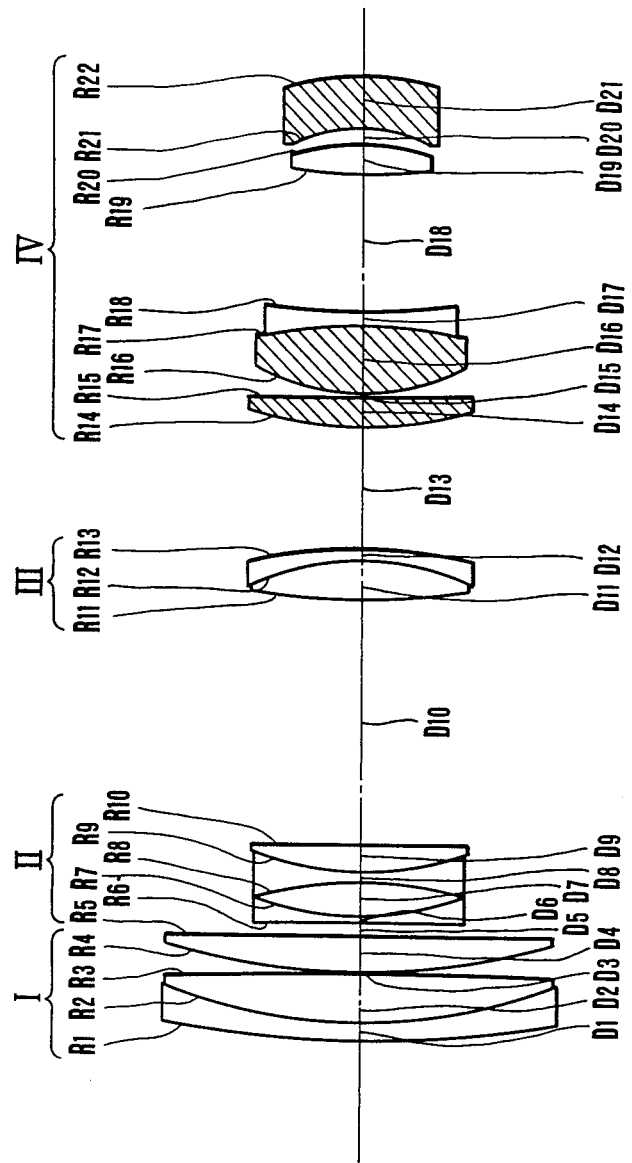
FIGS. 2(A) and 2(B) are respectively a block diagram of another specific variable focal length objective of the invention and a graphic representation of its aberrations.
Figure 2B:
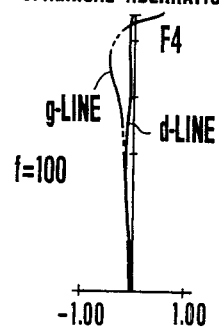
Figure 2B:
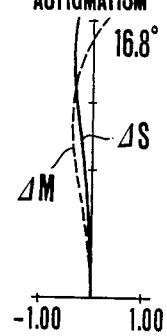
Figure 2B:
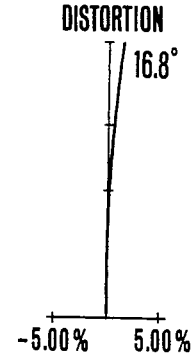
Figure 2B:
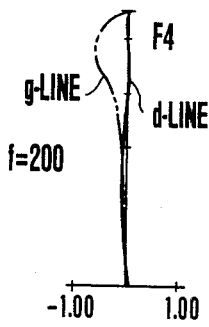
Figure 2B:
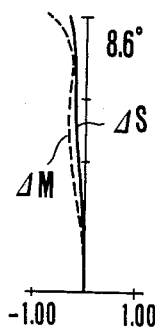
Figure 2B:
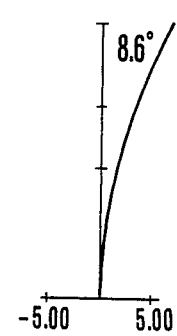
Figure 2B:
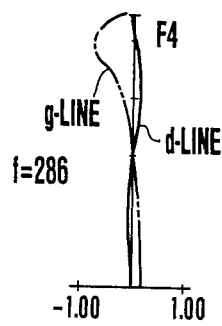
Figure 2B:
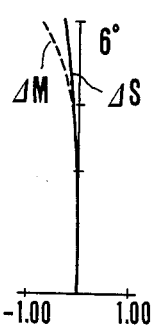
Figure 2B:
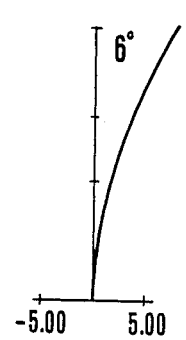

FIG. 2(A) is a longitudinal section view illustrating the construction and arrangements of the lens elements of another specific variable focal length objective of the invention, and FIG. 2(B) shows its spherical aberration, astigmatism and distortion in the focal length positions of f=100 mm, 200 mm and 286 mm.

This or second objective is of the similar type to that of the first one, comprising, from front to rear, a positive first lens unit I which is held stationary during zooming, a negative second lens unit II which axially moves with zooming to contribute to the variation of the focal length of the entire system, a positive third lens unit III which axially moves to compensate for the shift of an image plane during zooming, and a positive fourth lens unit IV which is held stationary during zooming, the fourth lens unit IV, or the so-called relay section, being divided into two parts of which the front part includes a frontmost lens of convex form which is a radial type refractive index distributive lens having a positive gradient power followed after a very short separation by a doublet consisting of a front lens of convex form which is a radial type refractive index distributive lens having a negative gradient power and a rear lens of homogeneous material, and the rear parts includes a rearmost lens of meniscus form which is a radial type refractive index distributive lens having a negative gradient power.

Whilst a decrease of the telephoto ratio of the conventional relay section for the purpose of shortening the total length of the variable focal length objective has resulted in deterioration of the Petzval sum to the negative direction with a rapid increase of the curvature of field in the direction to over-correction which could not be well corrected by any design of the other lens unit, it is in the objective of the invention that use is made of the radial type refractive index distributive lens having the negative gradient power in the rear part of the relay section or the positive fourth lens unit IV so that the interior of that lens because of its having a diverging effect contributes to an increase in the negative power of the rear part, thereby the telephoto ratio of the relay section is decreased. Since the Petzval sum produced from the refractive index distribution type lens is small, curvature of field is hardly produced. The use of the two refractive index distribution type lenses in the front part of the relay section provides a possibility of achieving a further reduction of the total length of the entire system, while nevertheless permitting good correction of not only the curvature of field, but also spherical aberration, coma and astigmatism to be performed.

The numerical data in accordance with which the second specific objective of the invention can be constructed are given in Tables 2.1 to 2.3.

TABLE 2.1

$f = 100\text{-}286 \quad FNO = 4.0 \quad 2\omega = 33.5°\text{-}12°$

| Radius of curvature | Axial thickness or air separation | Refractive index | Abbe number |
|---|---|---|---|
| R1 = 195.068 | D1 = 3.76 | N1 = 1.80518 | $\nu 1$ = 25.4 |
| R2 = 93.266 | D2 = 9.40 | N2 = 1.61272 | $\nu 2$ = 58.7 |
| R3 = 58340.891 | D3 = 0.14 | | |
| R4 = 131.571 | D4 = 6.69 | N3 = 1.61272 | $\nu 3$ = 58.7 |
| R5 = 221519.437 | D5 = Variable | | |
| R6 = 714.405 | D6 = 2.09 | N4 = 1.71300 | $\nu 4$ = 53.8 |
| R7 = 55.496 | D7 = 5.88 | | |
| R8 = −62.772 | D8 = 1.95 | N5 = 1.71300 | $\nu 5$ = 53.8 |
| R9 = 62.789 | D9 = 4.74 | N6 = 1.84666 | $\nu 6$ = 23.9 |
| R10 = −1831.869 | D10 = Variable | | |
| R11 = 148.046 | D11 = 8.08 | N7 = 1.51633 | $\nu 7$ = 64.1 |
| R12 = −44.817 | D12 = 1.95 | N8 = 1.75520 | $\nu 8$ = 27.5 |
| R13 = −79.338 | D13 = Variable | | |
| R14 = 62.624 | D14 = 5.74 | N9 = N9 (h) | |
| R15 = 7841.012 | D15 = 0.14 | | |
| R16 = 38.557 | D16 = 13.28 | N10 = N10 (h) | |
| R17 = −82.341 | D17 = 2.09 | N11 = 1.92286 | $\nu 11$ = 20.9 |
| R18 = 149.496 | D18 = 27.21 | | |
| R19 = 137.780 | D19 = 5.57 | N12 = 1.53256 | $\nu 12$ = 45.9 |
| R20 = −37.470 | D20 = 3.16 | | |
| R21 = −26.092 | D21 = 10.12 | | |
| R22 = −38.926 | | N13 = N13 (h) | |

TABLE 2.2

| Di | f | | |
|---|---|---|---|
| | 100 | 200 | 286 |
| D5 | 2.3926 | 47.5055 | 61.0879 |
| D10 | 47.1435 | 22.2934 | 0.9012 |
| D13 | 23.2591 | 2.9962 | 10.8061 |

TABLE 2.3

| Ni (h) | $\lambda$ | $N_0$ | $N_1$ | $N_2$ | $N_3$ |
|---|---|---|---|---|---|
| N9 (h) | d | 1.53113 | $-1.40101 \times 10^{-4}$ | $5.15986 \times 10^{-8}$ | $1.44289 \times 10^{-10}$ |
| | g | 1.54160 | $-7.60684 \times 10^{-5}$ | $5.39739 \times 10^{-8}$ | $4.32743 \times 10^{-10}$ |
| N10 (h) | d | 1.51633 | $1.35945 \times 10^{-4}$ | $-6.07396 \times 10^{-8}$ | $-1.28137 \times 10^{-10}$ |
| | g | 1.52621 | $8.57620 \times 10^{-5}$ | $-7.83396 \times 10^{-8}$ | $-4.10306 \times 10^{-10}$ |
| N13 (h) | d | 1.53633 | $1.51842 \times 10^{-3}$ | $1.06359 \times 10^{-7}$ | $2.58554 \times 10^{-10}$ |
| | g | 1.52621 | $1.55218 \times 10^{-3}$ | $1.25181 \times 10^{-7}$ | $1.43805 \times 10^{-10}$ |

Figure 3B:
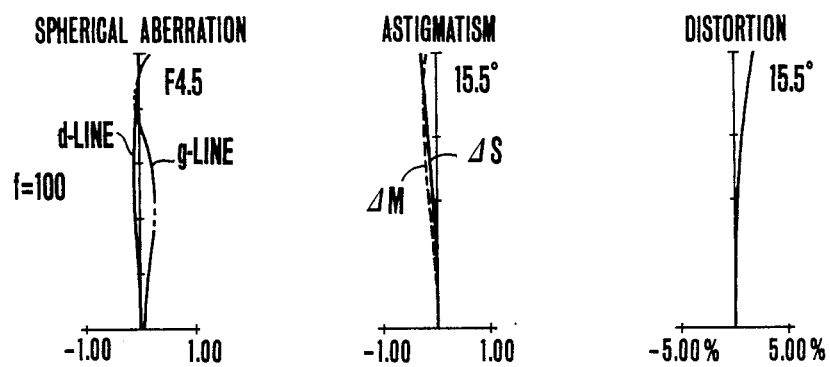
Figure 3B:
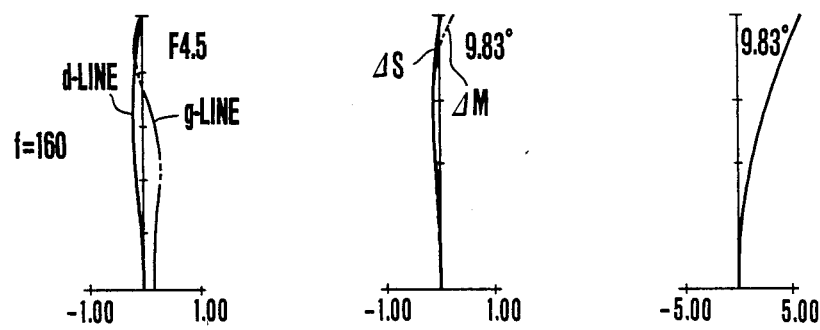
Figure 3B:
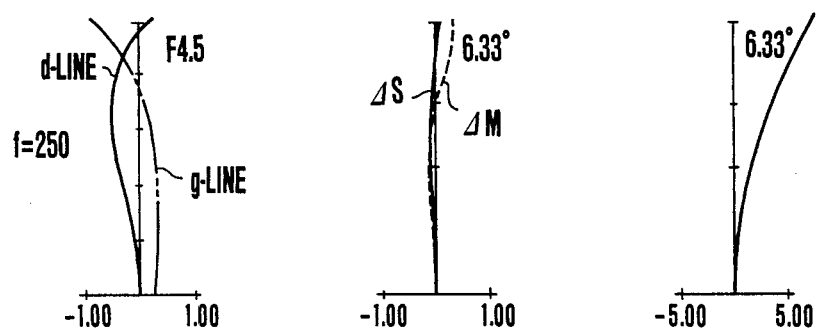

FIG. 3(A) is a longitudinal section view of the construction and arrangement of the lens elements of still another specific variable focal length objective of the invention, and FIG. 3(B) shows the spherical aberration, astigmatism and distortion of the objective of FIG. 3(A) in three different focal length positions of f=100 mm, 160 mm and 250 mm.

This or third objective of the invention comprises, from front to rear, a positive first lens unit I which axially moves during zooming, a negative second lens unit II which axially moves with zooming to contribute to variation of the focal length of the entire system, and a positive third lens unit III which is held stationary during zooming. The negative second lens unit II is constructed by only one radial type refractive index distributive lens. The positive third lens unit III is divided into two parts of which the front part comprises, from front to rear, a positive lens in the form of a radial type refractive index distributive lens having a negative gradient power, followed by a very small spacing by a doublet consisting of a positive front lens which is an axial type refractive index distributive lens in which the refractive index decreases as the distance from the front vertex increases, and a homogeneous rear lens, and the rear part includes a negative frontmost lens which is a radial type refractive index distributive lens having a negative gradient power.

The use of the radial type refractive index distributive lens of the negative gradient power in the negative second lens unit II enables the Petzval sum to be decreased, and is advantageous for correcting the spherical aberration in the telephoto end. For example, under the condition of the same power arrangement, while the negative second lens unit II which would otherwise be made up of homogeneous material alone produces a Petzval sum of about −1.45 to −1.6 referred to the normalized focal length of the entire system to 1, it is in the invention that because of being constructed with the radial type refractive index distributive lens, it produces a very small Petzval sum of −0.96.

Since, in such a manner, the Petzval sum produced from the negative second lens unit II can be reduced, because the telephoto ratio of the relay section consisting of the positive third lens unit III can be decreased, it is made possible to achieve a remarkable reduction of the optical total length of the entire system. Also, due to the small Petzval sum of the negative second lens unit II, the positive third lens unit III or the relay section is allowed to be constructed in the form of the telephoto type, contributing to a decrease of the total length, and further since the positive third lens unit III, too, is constructed with inclusion of such refractive index distribution type lenses as has been described above, the tendency to the telephoto type is much more strengthened, thereby the telephoto ratio of the relay section is reduced to so small a value that the optical total length can be extremely shortened. Also, of the two negative lenses in the rear part of the positive third lens unit III which is stationary during zooming, the front negative lens has the radial type refractive index distribution having the negative gradient power, assisting in strengthening the negative power of the rear part, because its interior has a diverging effect. At this time, the Petzval sum ascribable to the interior is smaller than that ascribable to the refracting surfaces. Therefore, the over-correction of the curvature of field is weakened. Also, by controlling the refracting surfaces and the shape of the refractive index distribution, astigmatism is corrected.

Moreover, the front part, too, is included with the positive lens in the form of the radial type refractive index distributive lens having a gentle negative gradient power at the frontmost position thereof to allow for an increase of the power of the refracting surfaces of that positive lens with increase in the under-correction of the curvature of field. This enables the over-correction of the curvature of field to be corrected.

Also, because as the bi-convex lens of the cemented doublet in the front part of the positive third lens unit III use is made of the axial type refractive index distributive lens in which the refractive index becomes progressively lower as the axial distance from the front vertex increases, for such a refractive index distribution takes another form at the front or convex surface in which the refractive index becomes progressively lower as the height from the optical axis increases, an effect of correcting spherical aberration and coma is produced, as the rays of light are less reflected than when the lens of homogeneous material is used.

Thus, the field curvature which would otherwise tend to be over-corrected when the relay section is formed to a strong telephoto type, can be corrected to a minimum, and it becomes possible to well correct spherical aberration, coma and astigmatism. And, the index to the portability, or the ratio of the physical length when set in the casing therefor (at the wide angle end) to the longest focal length, or the so-called telephoto ratio can be taken at a very small value of 0.645.

The third specific objective of the invention can be constructed in accordance with the lens data, the lens separations during zooming, and the refractive index distribution coefficients of the used refractive index distribution type lenses given in Tables 3.1 to 3.3.

TABLE 3.1

| f = 100–250   FNO = 4.5   $2\omega = 31°$–$12.7°$ | | | |
|---|---|---|---|
| Radius of curvature | Axial thickness or air separation | Refractive index | Abbe number |
| R1 = 106.084 | D1 = 3.32 | N1 = 1.80518 | $\nu1$ = 25.4 |
| R2 = 58.076 | D2 = 11.88 | N2 = 1.62374 | $\nu2$ = 47.1 |
| R3 = −489.144 | D3 = Variable | | |
| R4 = 1045.216 | D4 = 11.68 | N3 = N3 (h) | |
| R5 = −273.849 | D5 = Variable | | |
| R6 = 323.215 | D6 = 6.60 | N4 = N4 (h) | |
| R7 = −74.986 | D7 = 0.13 | | |
| R8 = 30.128 | D8 = 6.72 | N5 = N5 (x) | |
| R9 = −73.105 | D9 = 1.92 | N6 = 1.72151 | $\nu6$ = 29.2 |
| R10 = 397.026 | D10 = 28.66 | | |
| R11 = −55.865 | D11 = 2.19 | N7 = N7 (h) | |
| R12 = −62.834 | D12 = 16.63 | | |
| R13 = −26.147 | D13 = 2.55 | N8 = 1.51728 | $\nu8$ = 69.6 |
| R14 = −66.609 | | | |

TABLE 3.2

| | f | | |
|---|---|---|---|
| Di | 100 | 160 | 250 |
| D3 | 0.7249 | 47.4124 | 75.4248 |
| D5 | 19.6360 | 12.7996 | 2.5449 |

TABLE 3.3

| Ni (h) | $\lambda$ | $N_0$ | $N_1$ | $N_2$ | $N_3$ | $N_4$ |
|---|---|---|---|---|---|---|
| N3 (h) | d | 1.51633 | $1.20582 \times 10^{-3}$ | $2.17677 \times 10^{-7}$ | $8.81288 \times 10^{-11}$ | $3.44547 \times 10^{-14}$ |
|  | g | 1.52621 | $1.20921 \times 10^{-3}$ | $2.15365 \times 10^{-7}$ | $1.35241 \times 10^{-11}$ | $-3.86704 \times 10^{-13}$ |
| N4 (h) | d | 1.62041 | $1.31092 \times 10^{-4}$ | $1.83723 \times 10^{-7}$ | $2.97786 \times 10^{-10}$ | $3.60954 \times 10^{-13}$ |
|  | g | 1.63316 | $1.59485 \times 10^{-4}$ | $2.54635 \times 10^{-7}$ | $2.17559 \times 10^{-10}$ | $6.92295 \times 10^{-13}$ |
| N5 (h) | d | 1.63854 | $-8.10577 \times 10^{-3}$ | $3.54976 \times 10^{-4}$ | $-4.23447 \times 10^{-5}$ | |
|  | g | 1.65292 | $-7.85935 \times 10^{-3}$ | $3.67316 \times 10^{-4}$ | $-6.08825 \times 10^{-5}$ | |
| N7 (h) | d | 1.51633 | $6.19898 \times 10^{-4}$ | $2.48844 \times 10^{-6}$ | $4.66251 \times 10^{-9}$ | $1.04867 \times 10^{-12}$ |
|  | g | 1.52621 | $5.73366 \times 10^{-4}$ | $2.60420 \times 10^{-6}$ | $2.63683 \times 10^{-9}$ | $1.17387 \times 10^{-11}$ |

Figure 4A:
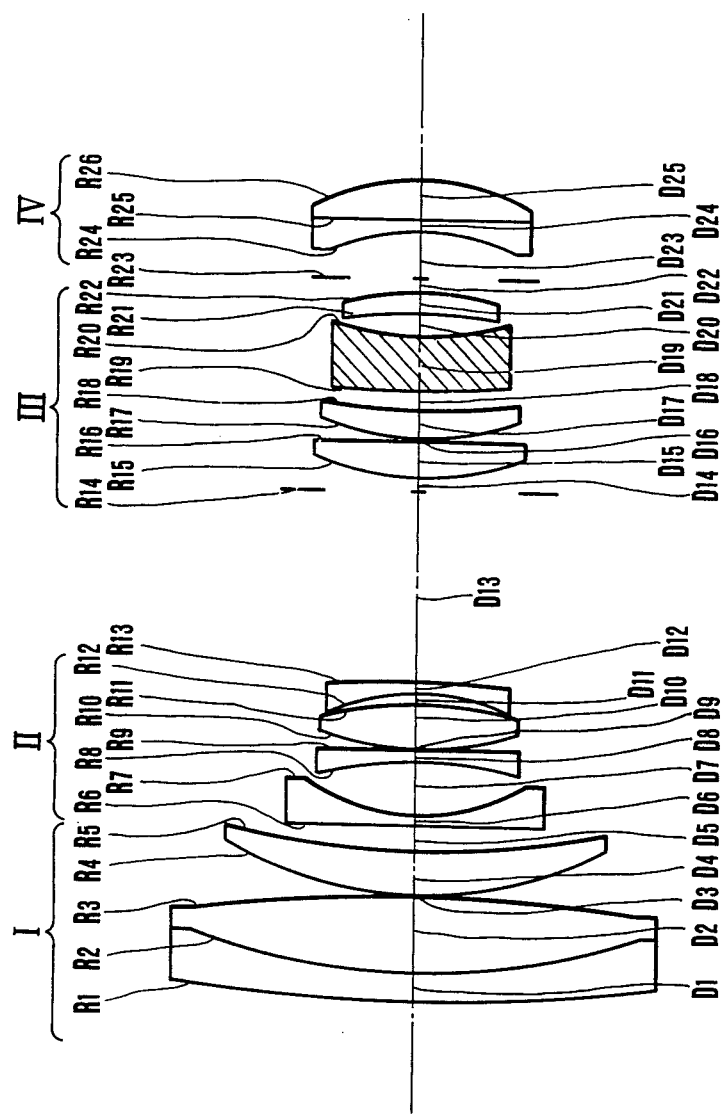
FIGS. 4(A) and 4(B) are respectively a block diagram of a further specific variable focal length objective of the invention and a graphic representation of its aberrations.

FIG. 4(A) is a longitudinal section view of the construction and arrangement of the lens elements of a further specific variable focal length objective of the invention, and FIG. 4(B) shows the spherical aberration, astigmatism and distortion of the objective of FIG. 4(A) in three different focal length positions of f=100 mm, 170 mm and 281 mm.

This objective comprises from front to rear a positive first lens unit I which axially moves during zooming, a negative second lens unit II which axially moves during zooming, a positive third lens unit III which axially moves during zooming, and a negative fourth lens unit IV which is held stationary during zooming, whereby as zooming from the wide angle end to the telephoto end, the positive first lens unit I and positive third lens unit III are moved forward, and the negative second lens unit II is moved rearward to vary the focal length the entire system, and the third lens counting from front in the positive third lens unit III consists of a radial type refractive index distributive lens having a negative gradient power.

In the zoom type as such, the strenghtening of the power of each of the lens unit leads to shorten the optical total length of the entire system. Another conventional method for shortening the optical total length of the entire system is to construct the positive third lens unit III in the form of the telephoto type, and strengthen the tendency to the telephoto type to make up such a power arrangement that the principal point is brought ahead with the result that the interval between the principal points of the negative second and positive third lens units is reduced. As has been described above, these conventional methods had a drawback that as the Petzval sum took a negative large value, over-correction of curvature of field resulted.

In this specific embodiment, as the negative third lens of the positive third lens unit III use is made of a refractive index distribution type lens having the negative gradient power which satisfies the above-stated inequalities (1) and (2), thereby, despite the employment of such a power arrangement as described above, it is made possible to minimize the deterioration of the Petzval sum in the direction to a negative value. Thus, a shortening of the optical total length can be achieved.

Further, the thus-created room for correction of the Petzval sum is partly reflected to allow for use of a glass of high refractive index in the positive lens of the positive third lens unit with an advantage of correcting spherical aberration and astigmatism. As a result, a variable focal length objective of high grade imagery becomes possible to realize.

Figure 4:
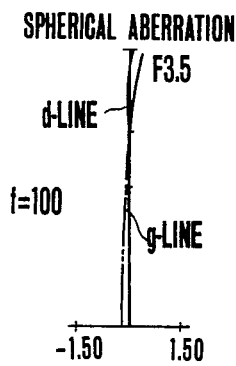
Figure 4:
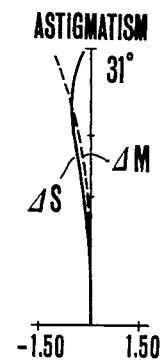
Figure 4:
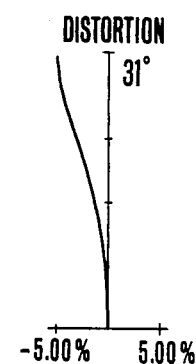
Figure 4:
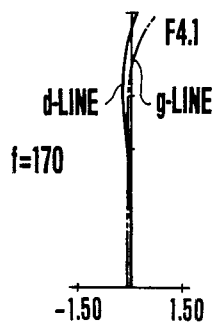
Figure 4:
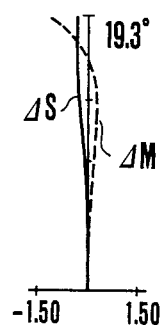
Figure 4:
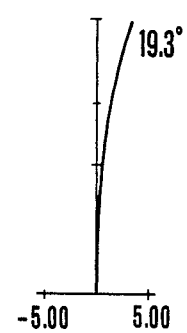
Figure 4:
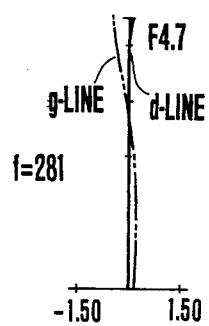
Figure 4:
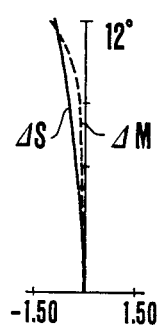
Figure 4:
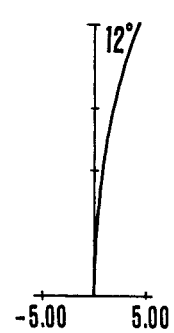

The specific objective of the invention shown in FIG. 4 can be constructed in accordance with the numerical data given in Tables 4.1 to 4.3 below.

TABLE 4.1

$f = 100-281$  $FNO = 3.5-4.7$  $2\omega = 62°-24°$

| Radius of curvature | Axial thickness or air separation | Refractive index | Abbe number |
|---|---|---|---|
| R1 = 610.082 | D1 = 6.19 | N1 = 1.80518 | $v1$ = 25.4 |
| R2 = 173.207 | D2 = 21.62 | N2 = 1.60311 | $v2$ = 60.7 |
| R3 = −349.023 | D3 = 0.33 | | |
| R4 = 101.647 | D4 = 11.00 | N3 = 1.60311 | $v3$ = 60.7 |
| R5 = 239.823 | D5 = Variable | | |
| R6 = 1163.134 | D6 = 3.30 | N4 = 1.80400 | $v4$ = 46.6 |
| R7 = 46.748 | D7 = 14.33 | | |
| R8 = −111.152 | D8 = 3.16 | N5 = 1.83481 | $v5$ = 42.7 |
| R9 = 309.530 | D9 = 0.63 | | |
| R10 = 93.107 | D10 = 12.38 | N6 = 1.80518 | $v6$ = 25.4 |

TABLE 4.1-continued $f = 100-281$  $FNO = 3.5-4.7$  $2\omega = 62°-24°$

| Radius of curvature | Axial thickness or air separation | Refractive index | Abbe number |
|---|---|---|---|
| R11 = −97.659 | D11 = 2.17 | | |
| R12 = −67.211 | D12 = 3.16 | N7 = 1.80400 | $v7$ = 46.6 |
| R13 = −287.590 | D13 = Variable | | |
| R14 = 0.0 | D14 = 2.75 | | |
| R15 = 66.587 | D15 = 11.00 | N8 = 1.77250 | $v8$ = 49.6 |
| R16 = −604.172 | D16 = 0.28 | | |
| R17 = 83.030 | D17 = 6.88 | N9 = 1.62299 | $v9$ = 58.2 |
| R18 = 166.746 | D18 = 5.68 | N10 (h) | |
| R19 = 215.782 | D19 = 15.32 | | |
| R20 = 78.172 | D20 = 5.64 | | |
| R21 = −205.827 | D21 = 6.88 | N11 = 1.67000 | $v11$ = 51.6 |
| R22 = −66.821 | D22 = Variable | | |
| R23 = 0.0 | D23 = Variable | | |
| R24 = −54.766 | D24 = 3.03 | N12 = 1.80400 | $v12$ = 46.6 |
| R25 = −561.478 | D25 = 11.55 | N13 = 1.63930 | $v13$ = 44.9 |
| R26 = −53.306 | | | |

TABLE 4.2

| Di | f |  |  |
|---|---|---|---|
|  | 100 | 170 | 281 |
| D5 | 5.86 | 31.53 | 53.61 |
| D13 | 51.09 | 25.42 | 3.34 |
| D22 | 2.60 | 8.11 | 22.96 |
| D23 | 13.20 | 29.79 | 37.03 |

TABLE 4.3

| Ni (h) | $\lambda$ | $N_0$ | $N_1$ | $N_2$ | $N_3$ | $N_4$ |
|---|---|---|---|---|---|---|
| N10 (h) | d | 1.75520 | $1.69830 \times 10^{-4}$ | $6.66923 \times 10^{-8}$ | $9.09760 \times 10^{-14}$ | $6.82251 \times 10^{-15}$ |
| | g | 1.79132 | $1.86492 \times 10^{-4}$ | $6.90556 \times 10^{-8}$ | $-1.68010 \times 10^{-12}$ | $1.04054 \times 10^{-14}$ |

Figure 5A:
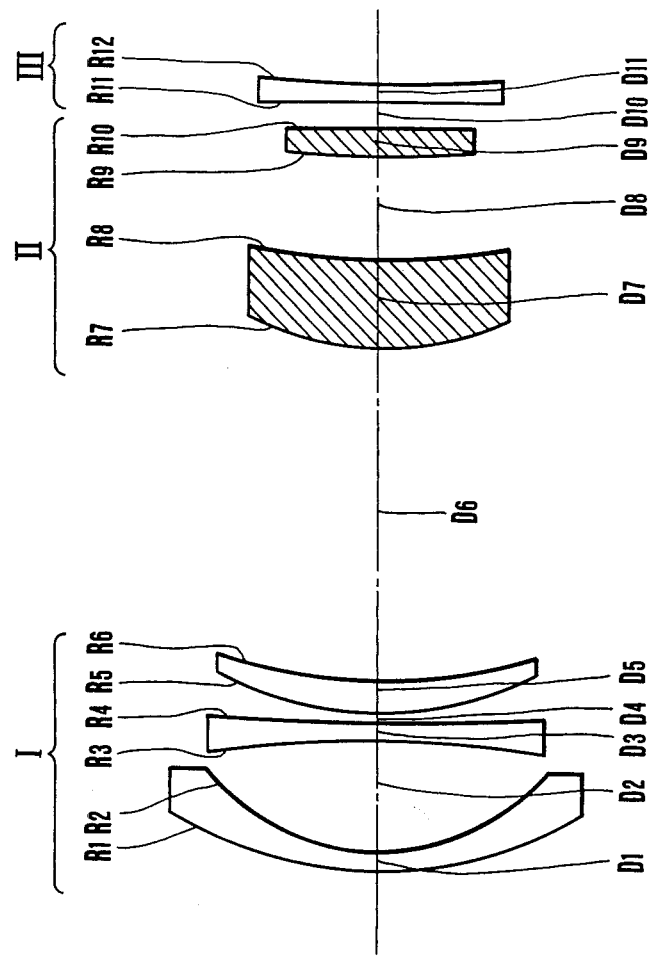
FIGS. 5(A) and 5(B) are respectively a block diagram of a furthermore specific variable focal length objective of the invention and a graphic representation of its aberrations.
Figure 5B:
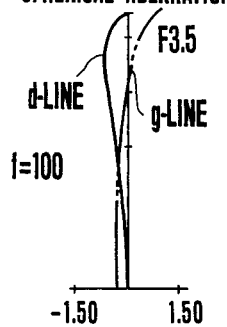
Figure 5B:
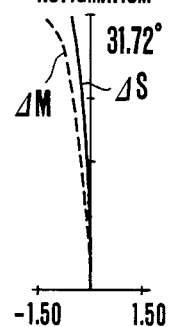
Figure 5B:
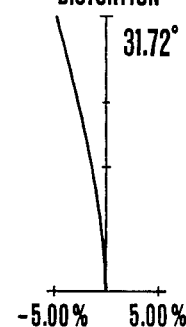
Figure 5B:
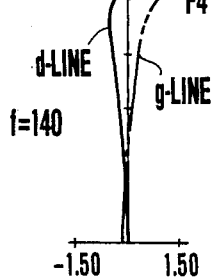
Figure 5B:
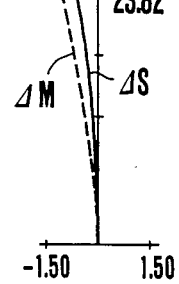
Figure 5B:
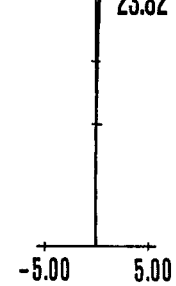
Figure 5B:
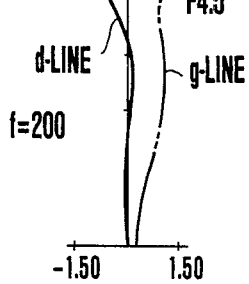
Figure 5B:
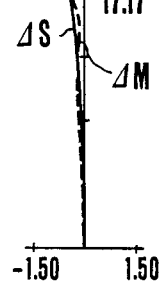
Figure 5B:
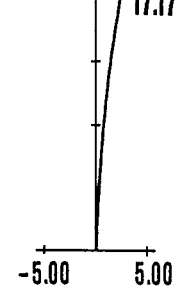

FIG. 5(A) is a longitudinal section view of the construction and arrangement of the lens elements of another specific variable focal length objective of the invention and FIG. 5(B) shows the spherical aberration, astigmatism and distortion of the objective of FIG. 5(A) in three different focal length positions of f=100 mm, 140 mm and 200 mm.

The objective of FIG. 5(A) comprises, from front to rear, negative first and positive second lens units I and II which axially move during zooming to vary the focal length of the entire system while compensating for the image shift, and a negative third lens unit III which is held stationary during zooming, the positive second lens unit II comprising, from front to rear, a radial type refractive index distributive lens having a positive gradient power and a radial type refractive index distributive lens having a negative gradient power. As the negative third lens unit III is introduced for the purpose of shortening the optical total length, this variable focal length objective may be considered to be an expanded form of the 2-component zoom lens.

In order to shorten the total length of such a type as this variable focal length objective, the positive second lens unit II may, similarly to the case of the 2-component zoom lens, be made the telephoto type. That is, even if the image magnification of the positive second lens unit II is the same, the shorter the focal length of the positive second lens unit II, the smaller the optical total length of the entire system can be made. In order to shorten the focal length of the positive second lens unit II while preserving the acceptable minimum separation between the positive first lens unit I and negative second lens unit II, said lens unit may be formed to the telephoto type, and the tendency to the telephoto type may be strengthened to make up a power arrangement such that the principal point is shifted forward. But, when the shortening of the total length is attempted by this method, the Petzval sum is increased largely in the negative sense.

However, the positive rear lens of the positive second lens unit II of the variable focal length objective of the invention is the refractive index distribution type lens having the negative gradient power. For this reason, the negative power of the rear part of the positive second lens unit II is made strenghtened, and the tendency of the positive second lens unit II is made strengthened to achieve a shortening of the total length. Also, since a smaller Petzval sum than from the refracting surfaces is produced, the over-correction of the curvature of field is diminished. Further, correction of distortion in the wide angle end, and astigmatism in the wide angle and telephoto ends is performed. Also, with the rays of light passing through the interior of the lens, an over-correction of spherical aberration results in balance with the under-correction of spherical aberration of the front part of the positive second lens unit II.

The positive front lens of the positive second lens unit II has a radial type refractive index distribution having a positive gradient power, and has an effect of over-correcting spherical aberration at the front surface thereof when it usually produces large spherical aberration. Therefore, it is made possible to achieve a variable focal length objective well corrected for aberrations in the entire focal length range and having its lens back made long enough to preserve the necessary value.

The objective of the invention shown in FIG. 5 can be constructed in accordance with the numerical data given in Tables 5.1 to 5.3 below.

TABLE 5.1 f = 100–200  FNO = 3.5–4.5  2ω = 63.44°–34.35°

| Radius of curvature | Axial thickness or air separation | Refractive index | Abbe number |
|---|---|---|---|
| R1 = 79.442 | D1 = 4.27 | N1 = 1.69680 | ν1 = 55.5 |
| R2 = 45.721 | D2 = 25.58 | | |
| R3 = −223.812 | D3 = 3.72 | N2 = 1.69680 | ν2 = 55.5 |
| R4 = 458.898 | D4 = 1.10 | | |
| R5 = 69.535 | D5 = 7.35 | | |
| R6 = 98.647 | D6 = Variable | N3 = 1.75520 | ν3 = 27.5 |
| R7 = 63.894 | D7 = 19.38 | N4 = N4 (h) | |
| R8 = 182.790 | D8 = 22.76 | | |
| R9 = 253.153 | D9 = 7.28 | N5 = N5 (h) | |
| R10 = −3226.156 | D10 = Variable | | |
| R11 = 1408.323 | D11 = 4.13 | N6 = 1.48749 | ν6 = 70.2 |
| R12 = 264.158 | | | |

TABLE 5.2

| Di | f | | |
|---|---|---|---|
| | 100 | 140 | 200 |
| D6 | 77.0198 | 39.0995 | 10.6593 |

TABLE 5.2-continued

| Di | f | | |
|---|---|---|---|
| | 100 | 140 | 200 |
| D10 | 4.9553 | 27.9256 | 62.3810 |

TABLE 5.3

| $N_i (h)$ | λ | $N_0$ | $N_1$ | $N_2$ | $N_3$ | $N_4$ |
|---|---|---|---|---|---|---|
| N4 (h) | d | 1.63854 | $-1.59742 \times 10^{-4}$ | $-6.11417 \times 10^{-8}$ | $-2.20806 \times 10^{-11}$ | $-1.40928 \times 10^{-14}$ |
| | g | 1.65292 | $-1.57014 \times 10^{-4}$ | $-6.20127 \times 10^{-8}$ | $-1.15164 \times 10^{-11}$ | $-2.18006 \times 10^{-14}$ |
| N5 (h) | d | 1.58313 | $3.53334 \times 10^{-4}$ | $3.46552 \times 10^{-7}$ | $2.07317 \times 10^{-10}$ | $1.51309 \times 10^{-13}$ |
| | g | 1.59529 | $3.59411 \times 10^{-4}$ | $3.8565 \times 10^{-7}$ | $4.5463 \times 10^{-12}$ | $4.54978 \times 10^{-13}$ |

As has been described above, the present invention is to provide a variable focal length objective which enables good correction of curvature of field and the valuable decrease of the optical total length to be achieved at the same time by using one or more refractive index distribution type lens or lenses under the prescribed conditions. Further, since the Petzval sum produced has a small negative value, there is no need for surfaces of strong curvature or steep power arrangement when the Petzval sum is corrected, so that as higher order aberrations are hardly increased, a desired increase in the relative aperture becomes possible to achieve, and the aberrations are maintained stable during zooming.

What is claimed is:

1. A variable focal length objective of which at least one of a plurality of lens units is moved to vary the image magnification, wherein at least one of said plurality of lens units has at least one refractive index distribution type lens provided with a condition of $N_1 > 0$ as, taking the distance from the optical axis to a radial direction as h, the refractive index distribution is expressed by $N(h) = N_0 + N_1 h^2 + N_2 h^4 + N_3 h^6 + \ldots$ ($N_0$, $N_1$, $N_2$ ... are constants), and satisfies the following conditions:

$$\frac{Lmin}{fmax} < 1.2 \times \exp\left\{0.5 \times \left(\frac{5y}{fmax} - 1\right)\right\}$$

$$\Sigma 2N_1^* D^* > 0.2/fmin$$

where
fmax: the maximum focal length;
fmin: the minimum focal length;
Lmin: the optical total length when the total length is shortest;
y: the maximum image height;
$N_1^*$: the coefficient of $h^2$ of the refractive index distribution type lens having a refractive index distribution of $N_1 > 0$;
$D^*$: the lens thickness of the refractive index distribution type lens having the refractive index distribution of $N_1 > 0$.

2. A variable focal length objective according to claim 1, wherein of said plurality of lens units, the rearmost lens unit and the frontmost lens unit are stationary during variation of the focal length, and a plurality of lens units arranged between both lens units move during variation of the focal length.

3. A variable focal length objective according to claim 2, wherein said refractive index distribution type lens is arranged in the lens unit movable for varying the focal length.

4. A variable focal length objective according to claim 3, wherein the lens unit in which said refractive index distribution type lens is arranged is the variator lens.

5. A variable focal length objective according to claim 2, wherein said refractive index distribution type lens is arranged in the rearmost lens unit.

6. A variable focal length objective according to claim 1, wherein of the plurality of lens units, the rearmost lens unit remains stationary during variation of the focal length, and a plurality of lens units arranged on the object side thereof move during variation of the focal length.

7. A variable focal length objective according to claim 6, wherein said refractive index distribution type lens is arranged in the lens unit movable for varying the focal length.

8. A variable focal length objective according to claim 6, wherein said refractive index distribution type lens is arranged in the rearmost lens unit.

9. A variable focal length objective according to claim 1, wherein the plurality of lens units move during variation of the focal length.

10. A variable focal length objective according to claim 9, wherein the rearmost lens unit has said refractive index distribution type lens.

* * * * *

UNITED STATES PATENT AND TRADEMARK OFFICE
CERTIFICATE OF CORRECTION

PATENT NO. : 4,776,679

DATED : October 11, 1988

INVENTOR(S) : NOZOMU KITAGISHI, ET AL.

It is certified that error appears in the above-identified patent and that said Letters Patent is hereby corrected as shown below:

[57] Abstract, title page,
    line 2, "pulrality" should read --plurality--.

Column 1,
    line 14, "proposal" should read --proposals--;
    line 54, "becuase" should read --because--.

Column 2,
    line 5, "another" should read --in other--;
    line 29, "designated" should read --designed--;
    line 59, "varible" should read --variable--.

Column 3,
    line 6, "furthermore" should read --further--;
    line 40, "distrubtion" should read --distribution--;
    line 56, "captial" should read --capital--;
    line 63, "power" should read --power attributed to--;
same line, "attributes to" should be deleted.

Column 4,
    line 35, "constant)" should read --constants)--;
    line 47, "Di (I = 1, 2, 3 ...)" should read
--Di (i = 1, 2, 3 ...)--;
    line 63, "second" should read --second lens--.

UNITED STATES PATENT AND TRADEMARK OFFICE
CERTIFICATE OF CORRECTION

PATENT NO. : 4,776,679

DATED : October 11, 1988

INVENTOR(S) : NOZOMU KITAGISHI, ET AL.

It is certified that error appears in the above-identified patent and that said Letters Patent is hereby corrected as shown below:

Column 5, line 4, "aII" should read --II--;

line 61, "a corresponding amount" should read --an amount corresponding--.

Column 7, line 24, "parts" should read --part--.

Column 10, line 35,

Table 3.1, "N5 = N5(x) should read --N5 = N5(h)--.

Column 11, line 10, "length" should read --length of--;

line 15, "strenghtening" should read --strengthening--;

line 16, "unit" should read --units--.

UNITED STATES PATENT AND TRADEMARK OFFICE
CERTIFICATE OF CORRECTION

PATENT NO. : 4,776,679

DATED : October 11, 1988

INVENTOR(S) : NOZOMU KITAGISHI, ET AL.

It is certified that error appears in the above-identified patent and that said Letters Patent is hereby corrected as shown below:

Column 12, line 13,
    Table 4.1, "N10(h) should read --N10 = N10(h)--.

Column 13,
    line 23, "strenghtened," should read --strengthened,--.

Signed and Sealed this

Seventh Day of March, 1989

Attest:

DONALD J. QUIGG

Attesting Officer      Commissioner of Patents and Trademarks